May 23, 1967 B. L. WALKER 3,320,963
PARTS CLEANING TANK WITH AGITATING PARTS RACK
Filed July 6, 1965 2 Sheets-Sheet 1

Buna L. Walker
INVENTOR.

BY Clarence A. O'Brien
and Harvey B. Jacobson
Attorneys

May 23, 1967  B. L. WALKER  3,320,963
PARTS CLEANING TANK WITH AGITATING PARTS RACK
Filed July 6, 1965  2 Sheets-Sheet 2
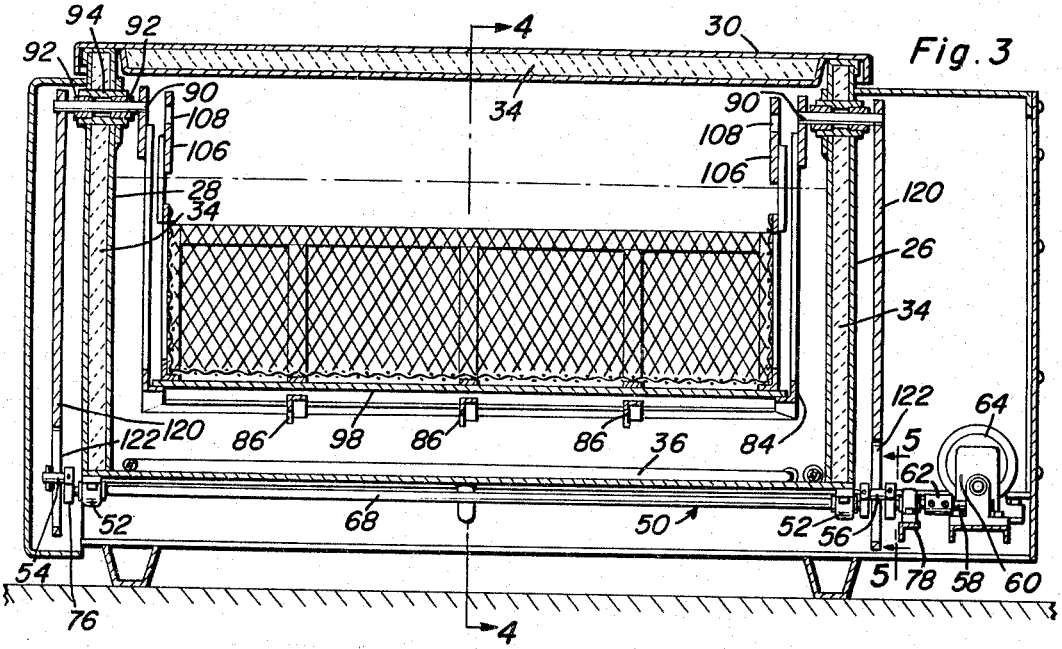
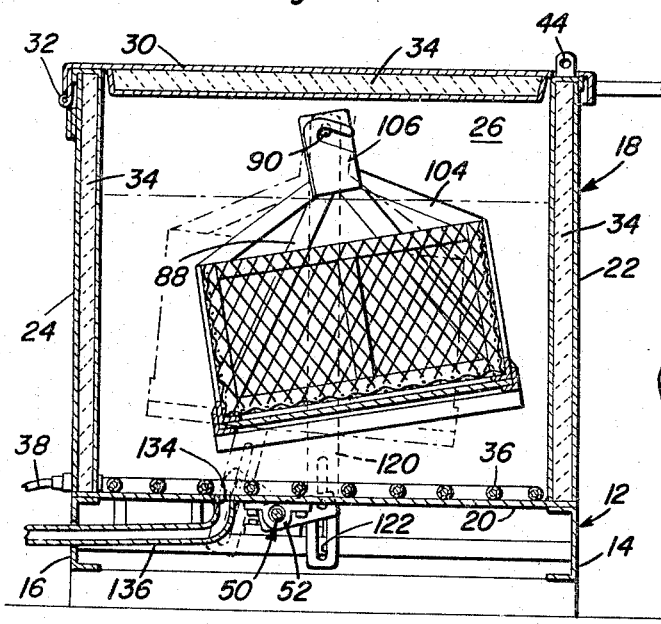
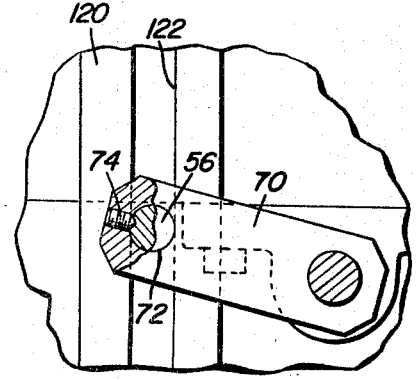
Buna L. Walker
INVENTOR.

United States Patent Office 3,320,963
Patented May 23, 1967

3,320,963
PARTS CLEANING TANK WITH AGITATING
PARTS RACK
Buna L. Walker, 105 Stone Creek Road,
Smyrna, Ga. 30080
Filed July 6, 1965, Ser. No. 469,609
10 Claims. (Cl. 134—57)

This invention relates to a novel and useful parts cleaning tank and more specifically to a parts cleaning tank in which a parts cleaning liquid may be placed and heated by means of electrical heating means operatively associated with the tank. The tank further includes a parts support rack which is swingably supported within the tank and which is power driven for limited back and forth oscillatory movement. The parts support rack is adapted to support a parts cleaning basket therefrom having the parts which are to be cleaned disposed therein and such a basket is provided and removably positioned on the rack for oscillatory movement therewith. In addition, the parts cleaning basket is provided with upwardly projecting lift means which are adapted to be readily releasably engaged by a lifting member whereby the basket may be readily lifted out of the parts cleaning tank.

The parts cleaning tank with agitating parts rack and parts basket therefor includes means for oscillating the parts rack about a generally horizontally disposed axis disposed above the liquid level in the tank and spaced appreciably above the bottom of the parts rack and the basket supported therefrom. In addition, the basket is provided with upwardly projecting lift arms whose upper end portions define downwardly opening hook members, the closed ends of these hook members being disposed along the axis about which the parts supporting rack is oscillated and therefore a lifting member extending between the hook members may be readily engaged therewith even during oscillation of the parts support racks.

Further, the parts cleaning tank includes an electric motor drivingly connected to the oscillatory parts support rack and timer control means is operatively associated with the electric motor whereby the latter may be actuated for termination of operation after a predetermined time lapse. The parts cleaning tank is also provided with thermostatic control means for operatively controlling electrical heating means also operatively associated with the tank whereby the cleaning fluid within the tank may be maintained at a predetermined temperature.

The main object of this invention is to provide an apparatus specifically designed to support and oscillate parts which are to be cleaned in a solution of cleaning fluid.

Another object of this invention is to provide the parts cleaning machine of the instant invention with means whereby the parts cleaning fluid disposed therein may be maintained at a predetermined temperature and whereby the parts cleaning support rack therefor may be oscillated about a predetermined horizontal axis with the lower portion of the parts cleaning support rack disposed slightly below the level of the cleaning fluid within the tank in order that the parts supported by the support rack will be oscillated through a path beneath but near the top of the cleaning solution disposed within the parts cleaning tank.

Still another object of this invention is to provide the parts cleaning tank with timer means operatively associated with motor means provided for oscillating the parts support rack whereby the parts cleaning tank may initially have parts to be cleaned disposed therein and supported from the rack after which the parts support rack may be actuated so that it will support and oscillate the parts to be cleaned through the cleaning fluid disposed within the tank for a predetermined time period thereby enabling operation of the parts cleaning tank in an unattended manner.

A still further object of this invention is to provide a parts cleaning tank in accordance with the preceding objects which will be automatic in operation and which includes a minimum number of parts thereby ensuring a minimum amount of maintenance problems and downtime for repairs.

A further object of this invention is to provide a parts support rack and basket therefor including means whereby the basket may be readily raised from within the parts cleaning tank during oscillation of the parts cleaning support rack.

Still another object of this invention is to provide a reasonably compact parts cleaning tank in accordance with the preceding objects and constructed in a manner whereby the parts support rack and the basket thereof may be loaded with up to approximately 1,000 pounds of parts or objects to be cleaned and including drive means for oscillating the support rack capable of efficiently oscillating the support rack fully loaded by means of a one-third horsepower electric motor with a gear reduction unit being utilized in the drive mechanism for drivingly connecting the electric motor to the oscillatory parts support rack.

A final object of this invention to be specifically enumerated herein is to provide a parts cleaning tank with an oscillatory parts support rack therefor which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal vertical sectional view taken substantially upon the plane indicated by the section line 3—3 of FIGURE 2;

FIGURE 4 is a vertical transverse sectional view taken substantially upon the plane indicated by the section line 4—4 of FIGURE 3;

FIGURE 5 is an enlarged fragmentary transverse vertical sectional view taken substantially upon the plane indicated by the section line 5—5 of FIGURE 3.

Figure 1:
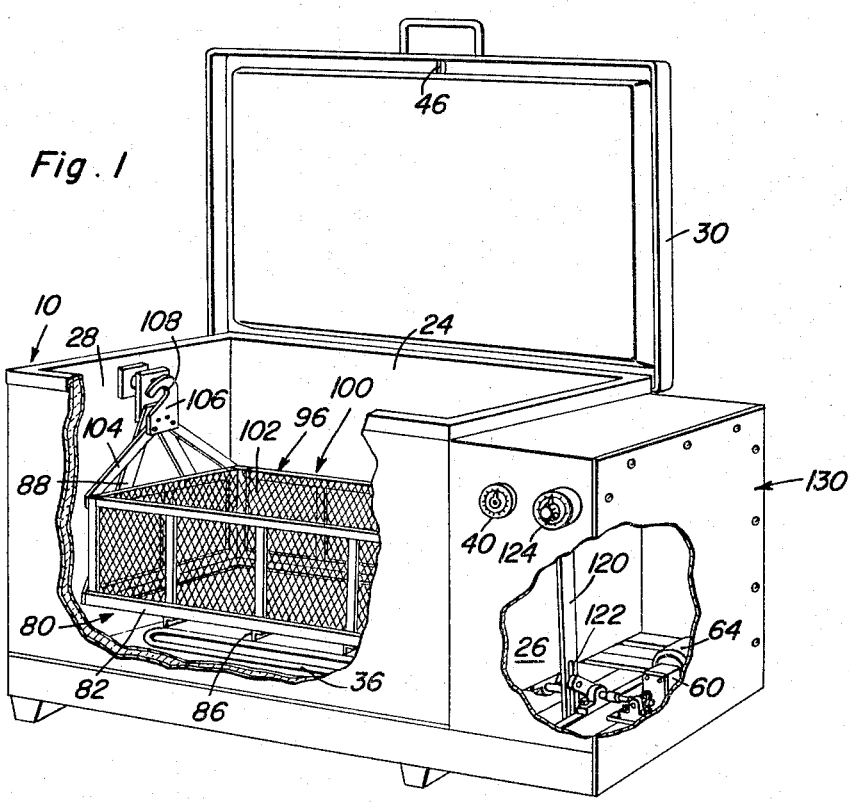
FIGURE 1 is a perspective view of the parts cleaning tank shown with the top thereof in an open position and with parts broken away and shown in section to more clearly illustrate the structural and operational features thereof.

With reference now more specifically to the drawings the numeral 10 generally designates the parts cleaning tank of the instant invention. The tank 10 includes an enlarged base frame generally referred to by the reference numeral 12 including rigidly interconnected longitudinally extending opposite side members 14 and 16. An open top reservoir generally referred to by the reference numeral 18 and including a bottom wall 20, a pair of upstanding opposite sidewalls 22 and 24 and a pair of upstanding opposite endwalls 26 and 28 is positioned on and secured to the base frame 12 in any convenient manner and is provided with a hinged top wall 30 pivotally secured to the sidewall 24 by means of a piano-type hinge assembly 32.

The opposite sidewalls 22 and 24, the opposite endwalls 26 and 28, and the top wall 30 are of double wall construction and insulation 34 is disposed between each pair of inner and outer wall sections of the walls 22, 24, 26, 28 and 30.

Disposed in the bottom of the reservoir 18 is an electrical element 36 which may be operatively connected to a suitable source of electrical potential by means of an electrical conductor 38 and whose operation is operatively controlled by means of an adjustable thermostat 40.

The top wall 30 is provided with a lifting handle 42 and an upstanding apertured lug 44 carried by the sidewall 22 projects upwardly through a slot 46 formed in the top wall 30 whereby the top wall 30 may be locked in the closed position illustrated in FIGS. 3 and 4 of the drawings.

A crankshaft assembly generally referred to by the reference numeral 50 is journaled from the bottom wall 20 by means of pillar blocks 52 and the crankshaft assembly 50 may be seen to include a pair of eccentrically disposed crankpins 54 and 56 which are spaced outwardly of the opposite ends of the reservoir 18.

The end of the crankshaft assembly 50 adjacent the throw 56 is coupled to an output shaft 58 of a gear reduction drive assembly 60 by means of a coupling member 62 and it may be seen from FIGS. 1 and 3 of the drawings that the output shaft 58 of the gear reduction assembly 60 is driven by means of an electric motor 64 whose output shaft (not shown) is drivingly connected to the input shaft (not shown) of the gear reduction drive assembly 60.

FIGURE 5 of the drawings gives a clear illustration of the manner in which the crankpins 54 and 56 are supported from the main shaft portion 68 of the crankshaft assembly 50. A pair of crank arms 70 which generally parallel each other are fixedly secured on the two axially aligned sections of the main shaft portion 68 and include a pair of aligned bores 72 at their free ends in which the opposite ends of the crankpin 56 are secured by means of setscrews 74. The crankpin 54 is supported by means of a similar crank arm 76 but is provided with only one supporting crank arm as opposed to the pair of crank arms supporting the crankpin 56.

The short section of the main shaft portion 68 extending between the coupling 62 and the adjacent crank arm 70 is journaled by means of a pillar block 78 indirectly supported from the base frame 12.

A support frame generally referred to by the reference numeral 80 is supported within the reservoir 18 for oscillation about a horizontally disposed axis extending longitudinally of the reservoir 18. The parts support frame or rack 80 is constructed of interconnected pairs of opposite side and end L-shaped frame members 82 and 84 with a plurality of brace members 86 extending between and spaced longitudinally of the opposite side members 82. The opposite ends of the support frame or rack 80 include a pair of inverted V-shaped upstanding support legs 88 and the upper end of each leg 88 has an outwardly projecting stub axle portion 90 fixed thereon in any convenient manner. The stub axle portions 90 are axially aligned and journaled in pairs of bearing journals 92 supported from the corresponding endwall of the reservoir 18 by means of a support sleeve 94 secured through the corresponding endwall of the reservoir 18. It is to be noted that the support sleeves 94 are disposed above the normal level of cleaning fluid which is to be disposed within the reservoir 18 and therefore that there will not be any opportunity for the parts cleaning fluid to leak out of the reservoir 18 by means of the bearing journals for the stub axle portions 90.

A parts cleaning basket generally referred to by the reference numeral 96 is provided and positioned on the support frame or rack 80 with an imperforate panel 98 disposed between the inturned horizontal flange portions of the opposite side and end members 82 and 84 and the bottom of the basket 96.

The basket 96 includes a frame assembly generally referred to by the reference numeral 100 over which wire mesh 102 is secured to form the opposite side and end walls as well as the bottom wall of the basket 96. The opposite ends of the frame assembly 100 include a pair of inverted V-shaped lifting arms 104 which carry lifting members 106 at their upper ends defining downwardly opening hook members 108. The closed ends of the hook members 108 are aligned with the axis of rotation of the support frame 80 defined by the stub axle portions 90 and therefore it may be seen that the closed ends of the hook members 108 do not shift during oscillation of the support frame 80.

Figure 6:
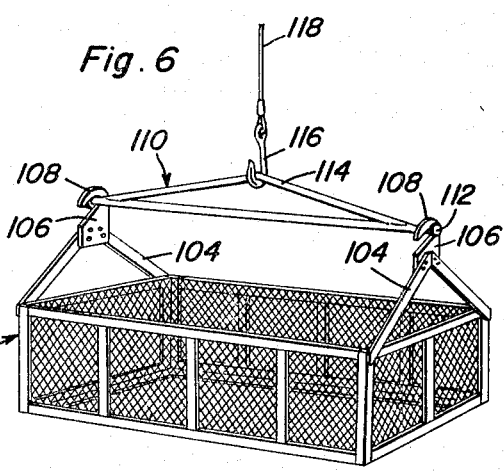
FIGURE 6 is a perspective view of the parts cleaning basket of the instant invention showing the manner in which it may be lifted out of and lowered into the parts cleaning tank of the instant invention.

In FIG. 6 of the drawings there may be seen a lift member generally referred to by the reference numeral 110 defining an elongated horizontally disposed member including diametrically enlarged end caps 112. The lift member 110 is provided with a portion 114 with which a lifting hook 116 may be readily operatively engaged and the opposite ends of the lift member 110 are freely receivable in the hook members 108 with the latter received between the diametrically enlarged opposite end portions 112. Therefore, it may be seen that the cable 118 to which the hook member 116 is secured may be readily utilized to lift the basket 96 out of the reservoir 18 even during oscillation of the support frame 80 inasmuch as the lift member 110 may be readily engaged with the hook members 108 while the parts cleaning machine is in operation.

The outer ends of the stub axle portions 90 have the upper ends of a pair of depending torque arms 120 secured thereto and the lower ends of the torque arms 120 are slotted at 122 with the crankpins or throws 52 and 54 extending through the slots 122 and freely operable therein. Accordingly, it may be seen that upon operation of the electric motor 64 effected by the controlling timer 124 the crankshaft assembly 50 will be rotated thereby effecting oscillation of the support frame 80 and the basket 96 disposed thereon. It is to be understood that the level of the cleaning fluid within the reservoir 18 will be disposed slightly above the upper surface of the parts disposed within the basket 96 and therefore that the parts to be cleaned will be oscillated in the cleaning fluid a spaced distance below the upper surface of the cleaning fluid and above the bottom of the reservoir 18. In this manner, the parts to be cleaned will be oscillated in the cleanest portion of the cleaning fluid, a major portion of the material removed by the cleaning fluid being of the type to precipitate out and fall toward the bottom of the reservoir 18.

Figure 2:
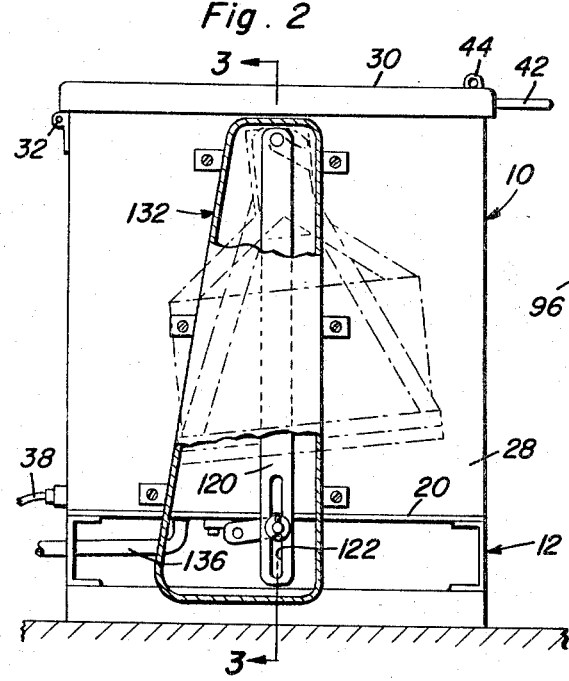
FIGURE 2 is an end elevational view of the parts cleaning tank as seen from the left side of FIGURE 1 and with the top of the tank in a closed position and parts of a cover panel for the drive mechanism of the parts cleaning tank being broken away and shown in vertical section.

With attention now invited to FIG. 2 of the drawings it may be seen that when the torque arms 120 are substantially vertically disposed the support frame 80 is displaced laterally to one side of a true upright position. Therefore, the drive assembly drivingly coupling the motor 64 to the support frame 80 may more readily initiate oscillation of the support frame or rack 80.

From FIG. 1 of the drawings it may be seen that an end enclosure generally referred to by the reference numeral 130 is removably supported from the end of the base frame 12 which supports the electric motor 64 and encloses the latter together with the gear reduction drive assembly 60 and the adjacent torque arm 120. In addition, a second end enclosure generally referred to by the reference numeral 132 is supported from the remote end of the reservoir 18 and encloses the corresponding torque arm 120 and its driving connection with the crankshaft assembly 50.

The bottom wall 20 of the reservoir 18 is provided with an outlet opening 134 with which the inlet end of an outlet tube 136 is operatively communicated. Accordingly, it may be seen that all or portions of the parts cleaning fluid within the reservoir 18 may be readily drawn therefrom. If only portions of the parts cleaning fluid are to be drawn from the reservoir 18, it will of course be understood that the most contaminated parts cleaning fluid will first be drawn from the reservoir 18 inasmuch as the outlet opening 134 is formed in the bottom wall 20 of the reservoir 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A parts cleaning tank comprising an open top reservoir including a bottom wall and upstanding opposite side walls, a parts basket support rack including bottom means and upstanding support means projecting upwardly from remote portions of said bottom means, oppositely projecting stub axle means fixed to the upper ends of said support means and journalled through said side walls for rotation about aligned axes, a drive shaft extending beneath said bottom wall between said side walls and journalled for rotation about an axis generally paralleling said axes, a pair of upstanding torque arms secured, at their upper ends, to the portions of said stub axle means projecting through said side walls, said drive shaft including crank means operatively connected to the lower ends of said torque arms for oscillating the latter about the axes of rotation of said stub axle portions in response to rotation of said crank shaft.

2. The combination of claim 1 including a parts basket removably positioned on said rack and including upstanding handle portions defining downwardly opening hook portions closed at their upper ends and whose closed upper ends lie along said aligned axes.

3. The combination of claim 1 wherein the lower ends of said torque arms have longitudinally extending slots formed therein, said crank means including eccentrically disposed crank pin means rotatably and slidably received in said slots.

4. The combination of claim 1 wherein said reservoir includes a hinged closure cover movable from a position fully closing the upper end of said reservoir and an open out-of-the-way position allowing full access to the interior of said reservoir.

5. The combination of claim 1 wherein said opposite side walls include heat insulation means and said reservoir has heating means disposed therein.

6. The combination of claim 5 including control means operatively connected to said heating means for control of the operation thereof.

7. The combination of claim 6 wherein said control means includes timer means operable to automatically cause operation of said heating means for a pre-selected time interval.

8. The combination of claim 7 wherein said control means includes thermostatic means operable to maintain the temperature of the cleaning fluid in said reservoir within a predetermined temperature range.

9. The combination of claim 1 including a parts basket removably positioned on said rack and including upstanding handle portions defining downwardly opening hook portions closed at their upper ends and whose closed upper ends lie along said aligned axes, the lower ends of said torque arms having longitudinally extending slots formed therein, said crank means including eccentrically disposed crank pin means rotatably and slidably received in said slots.

10. The combination of claim 1 wherein said reservoir includes a hinged closure cover movable from a position fully closing the upper end of said reservoir and an open out-of-the-way position allowing full access to the interior of said reservoir, said opposite side walls including heat insulation means and said reservoir has heating means disposed therein.

References Cited by the Examiner

UNITED STATES PATENTS

| 2,592,857 | 4/1952 | Chadwick | 134—160 X |
| 3,246,659 | 4/1966 | Ballard | 134—160 X |
| 3,276,459 | 10/1966 | Harrison | 134—140 X |

FOREIGN PATENTS 22,711  4/1910  Great Britain.

CHARLES A. WILLMUTH, *Primary Examiner.*

R. L. BLEUTGE, *Assistant Examiner.*